United States Patent [19]
Winsel

[11] Patent Number: 5,871,632
[45] Date of Patent: Feb. 16, 1999

[54] CONTROLLED AND REGULATED CONVEYING OF FLOWABLE MEDIA WITH A GAS EVOLUTION CELL AND A FLOW MULTIPLIER

[76] Inventor: August Winsel, Fesanenstrasse 8A, 65779 Kelkheim/Taunus, Germany

[21] Appl. No.: 856,629

[22] Filed: May 14, 1997

[30] Foreign Application Priority Data

May 14, 1996 [DE] Germany .................. 196 19 376.1

[51] Int. Cl.⁶ .................. C25B 9/00; B65D 83/14
[52] U.S. Cl. .................. 205/628; 205/633; 205/637; 204/269; 204/270; 204/275; 204/278; 204/271; 222/1
[58] Field of Search .................. 205/628, 633, 205/637; 204/269, 270, 275, 278, 271; 222/1

[56] References Cited

U.S. PATENT DOCUMENTS

| | | | |
|---|---|---|---|
| 5,242,565 | 9/1993 | Winsel | 204/265 |
| 5,423,454 | 6/1995 | Lippman et al. | 204/271 |
| 5,744,014 | 4/1998 | Gordon et al. | 204/271 |

*Primary Examiner*—Arun S. Phasge
*Attorney, Agent, or Firm*—Weiser and Associates, P.C.

[57] ABSTRACT

Process and apparatus for conveying flowing substances with the aid of an electrochemical gas evolution cell whose cell current generates primarily a gas volume flow which secondarily causes the volume flow of a decomposer liquid into a catalytic decomposer and which thereby initiates a quantity flow of the decomposer gas which transports the flowable conveyed medium to the intended location.

21 Claims, 1 Drawing Sheet

CONTROLLED AND REGULATED CONVEYING OF FLOWABLE MEDIA WITH A GAS EVOLUTION CELL AND A FLOW MULTIPLIER

BACKGROUND OF THE INVENTION

1. Field of the Invention

The present invention relates to the conveying of flowable media, and, in particular, to the conveying of such flowable media using gas evolution cells.

2. Description of the Related Art

According to German patent DE-PS 35 32 335.3, it is known in the art to convey technical or industrial fats using fat injectors powered by hydrogen evolution cells in ball and roller bearings. There are also infusers for injection or infusion of medical liquids, which are driven mechanically by gas evolution cells. In such devices, a constant or regulated electrical current in the gas evolution cell generates a gas volume stream that is proportional to this electrical current. The generating gas displaces a piston out of the working space of a cylinder in whose conveying space the medium to be conveyed, usually a paste or a liquid, is located. Since the gas evolution is proportional to the cell current such devices can be regulated and controlled very simply by varying the closing resistance of the cell.

In the hydrogen evolution cell described in German patent DE-PS 35 32 335.3, the hydrogen is generated by precipitation on a cathode with a hydrophilic/hydrophobic pore structure. The anode is zinc. The electrolyte is a potassium and sodium hydroxide solution. The gas evolution is limited by confining the electrochemical processes to the electrode. The cell current, the highest possible gas generation rate, and the maximal conveying rate of paste or liquid are all limited by this confined gas evolution. For higher conveying rates, larger gas evolution cells may be constructed and used or cells for parallel gas generation can be connected in series by known methods, but these involve increased costs. The increase and multiplication of the gas generation rate is the task of this invention.

Further aspects and advantages of this invention will become apparent from the detailed description which follows.

SUMMARY OF THE INVENTION

The present invention is directed to a process and apparatus for conveying flowable media. In certain embodiments, gas is generated using one or more gas evolution cells. A first substance is conveyed, by action of the generated gas, from a storage container into a reactor space containing a second substance. Additional gas is generated in the reactor space from reaction of the first and second substances. A piston is driven, by action of the generated additional gas, to convey the flowable media.

In alternative embodiments, the apparatus comprises (a) one or more gas evolution cells adapted to generate gas; (b) a first cylinder connected at a first end to the one or more gas evolution cells; and (c) a second cylinder connected to the second end of the first cylinder. The first cylinder comprises (1) a first piston separating, within the first cylinder, a working space from a first conveying space adapted to contain a first substance; (2) a first valve separating, within the first cylinder, the first conveying space from a reactor space adapted to contain a second substance; and (3) a second valve at a second end of the first cylinder. The second cylinder comprises a second piston separating, within the second cylinder, a gas space from a second conveying space adapted to contain the flowable media. When the one or more gas evolution cells generate gas, the generated gas enters the working space, thereby driving the first piston into the first conveying space, thereby driving the first substance contained therein through the first valve and into the reactor space, wherein the first and second substances react to generate additional gas that enters the gas space through the second valve, thereby driving the second piston into the second conveying space, thereby conveying the flowable media.

BRIEF DESCRIPTION OF THE DRAWINGS

Other aspects, features, and advantages of the present invention will become more fully apparent from the following detailed description, the appended claims, and the accompanying drawing(s) in which

DETAILED DESCRIPTION

Figure 1:
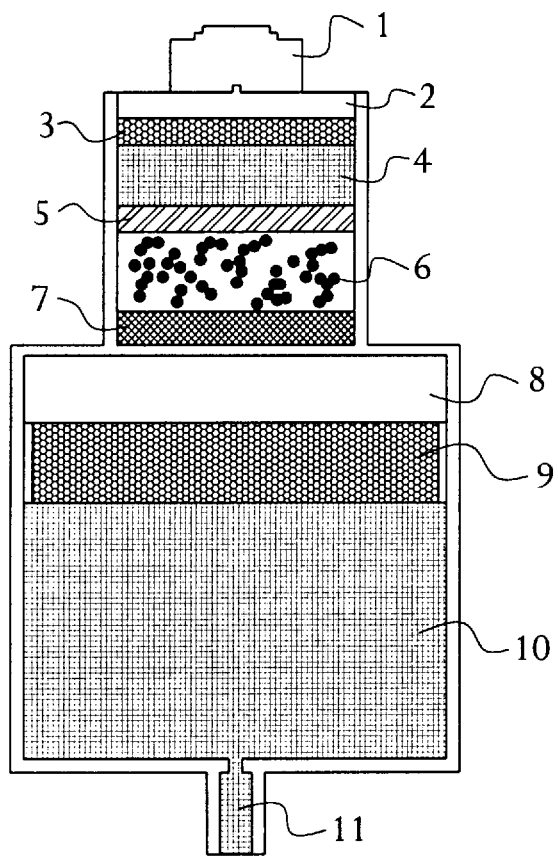
FIG. 1 illustrates an apparatus for executing a conveying process, according to one embodiment of the present invention.

It is known in the art that gases can be liberated from liquids. For example, hydrogen can be evolved by bringing an alkali borate, such as potassium borate ($KBH_4$) or sodium borate ($NaBH_4$), in aqueous solution into contact with a dehydrogenation catalyst. At that time, hydrogen is evolved according to the equation $KBH_4+2H_2O=NaBO_2+4H_2$ or $NaBH_4+2H_2O=NaBO_2+4H_2$. From 1 g of $NaBH_4$ upon decomposition, 2370 cm$^2$ of hydrogen are generated. In the case of a 10% solution, about 100 mg of $NaBH_4$ are contained in 1 cm$^2$ of solution. From this solution, therefore, 237 cm$^2$ of hydrogen are generated.

Such decomposition is inhibited in an alkaline solution and accelerated in an acidic solution. The decomposition takes place especially rapidly in the presence of dehydrogenation catalysts, especially of the metals in Group VIII of the Periodic Table of the Elements. Of these, for reasons of costs, raney nickel, which is obtained from a nickel/aluminum alloy by dissolving out the aluminum with the aid of an alkali leach, is suitable as a dehydrogenation catalyst. This catalyst is especially active if it contains additives of iron (10 wt. %) or cobalt. It is also advantageous to depyrophosphorize the raney nickel and to stabilize it by heat treatment.

If a solution of sodium borate is brought into contact with the raney nickel, then the borate is rapidly decomposed into hydrogen and sodium borate. The decomposition takes place also on such catalysts that contain platinum, palladium, nickel, and/or other metals in Group VIII on activated carbon, kieselguhr, aluminum oxide, or similar porous support materials. Acid solutions accelerate this decomposition process.

A gas stream can also be achieved by using an aqueous hydrazine ($N_2H_4$) solution as the decomposable liquid. Hydrazine decomposes on the above mentioned catalysts into an $H_2/N_2$ mixture with more or less large admixtures of ammonia according to the equations $N_2H_4=N_2+2H_2$ and $3N_2H_4=4NH_3+N_2$. On raney nickel, the decomposition preferentially goes into hydrogen and nitrogen. If raney nickel contains 10% iron, then the catalyst splits it into a very hot ammonia/nitrogen mixture.

By decomposition of hydrogen peroxide ($H_2O_2$), one can generate oxygen gas. The decomposable liquid $H_2O_2$ in aqueous solution is passed through one of the known decomposition catalysts and, at that time, decomposed into water and oxygen gas. Silver is preferably used as the catalyst and preferably in fine distribution as raney silver, as molecular silver powder, or as precipitated silver on a porous carrier mass (activated carbon, aluminum oxide, manganese dioxide).

FIG. 1 illustrates an apparatus for executing a conveying process, according to one embodiment of the present invention. Component 1 of the apparatus represents one or more gas evolution cells, preferably of the type described in German patent DE-PS 35 32 335.3 for generating hydrogen or oxygen at a rate controlled by the cell current. Component 1 also represents the electrical elements that control cell current, such as the load resistance and possibly an auxiliary current source. When the apparatus has two or more gas evolution cells, they are preferably connected in parallel for gas flow, but electrically in series.

In addition to the one or more gas evolution cells of component 1, the apparatus of FIG. 1 has two conveying cylinders. The first cylinder, which is connected at one end to component 1, has piston 3 separating working space 2 from conveying space 4, which is adapted to contain a first substance, such as a decomposable liquid. The first cylinder also has valve 5 separating conveying space 4 from reactor space 6 adapted to contain a second substance, such as a decomposition catalyst. In addition, the first cylinder has valve 7 at its other end. The second cylinder, which is connected to the first cylinder at valve 7, has piston 9 separating gas space 8 from conveying space 10, which is adapted to contain a flowable media to be conveyed.

The apparatus of FIG. 1 operates as follows. When the one or more gas evolution cells of component 1 generate gas, the generated gas enters working space 2, thereby driving piston 3 into conveying space 4, thereby driving the first substance contained therein through valve 5 and into reactor space 6, wherein the first and second substances react to generate additional gas that enters gas space 8 through valve 7, thereby driving piston 9 into conveying space 10, thereby conveying the flowable media (e.g., a powder, a paste, or a liquid) out at exit 11.

In a preferred embodiment, valve 5 is a coarse-pored hydrophobic disk that allows a decomposable liquid to pass from conveying space 4 into reactor space 6, while valve 7 is a fine-pored hydrophobic disk that blocks liquid but which allows the gas generated in reactor space 6 to enter gas space 8 of the second cylinder. Valve 5 is supposed to keep the decomposable liquid away from reactor space 6 as long as no gas pressure has built up in the gas evolution cells. During gas generation, valve 5 is supposed to assure uniform flux, so that no decomposition pulses arise in reactor space 6. Coarse-pored hydrophobic disk 5 retains the decomposable liquid in conveying space 4 and will pass the liquid only when its hydrostatic pressure relative to the pressure in reactor space 6 can overcome the capillary depression in the pores. In this sense, the apparatus of FIG. 1 operates even if the liquid in conveying space 4 is in a sponge that is squeezed by the action of piston 3. This sponge increases the retention security of the decomposable liquid.

In alternative implementations, the liquid in conveying space 4 need not itself be decomposable; it is sufficient if the liquid initiates the decomposition of a solid or liquid in reactor space 6 when it flows in through valve 5. For example, sodium borate powder—if necessary, mixed with a catalyst—may be stored in reactor space 6. When an aqueous liquid flows from conveying space 4 through valve 5 into reactor space 6, the borate powder is dissolved, comes into contact with the catalyst, and is decomposed. The decomposition process can also be influenced by the choice of the pH of the liquid, since acid solutions reduce the stability of the borate.

The possible absorption of water by sodium borate in reactor space 6 via hydrophobic valve disk 5 has an unfavorable effect on the stability of sodium borate during storage time. This effect can be prevented by using a valve 5 that, in the case of over pressure in conveying space 4, opens the path into reactor space 6 for the liquid, but which is not otherwise permeable to water vapor. This problem is solved by using a water-vapor-blocking bursting membrane whose blocking action is no longer necessary after the activation of the apparatus.

Apparatuses according to the present invention are highly adaptable to practical problems. This may be demonstrated by the following example. A hydrogen evolution cell of the size of a common hearing-aid cell with 6.5-mm diameter and 5.6-mm height delivers 2.2 mA on a short-circuit resistance of 130 $\Omega$. This current causes a flux of the decomposable liquid of 0.92 cm$^3$/h. If the decomposable liquid consists of 10% sodium borate solution, then the quantity of hydrogen of 0.92 cm$^3$/h generated in the gas evolution cell is multiplied to 218 cm$^3$/h by the apparatus of FIG. 1.

The quantity of catalyst in the reaction depends on the desired power. For the example mentioned, a catalyst quantity of 100 mg of raney nickel is sufficient. However, in order to increase the functional reliability, double to triple that quantity may be installed, depending on the design of the catalyst bed. Therefore, it is advantageous to stamp out rounds of a porous gas electrode as the catalyst bed, as described in European patent EP-PS 0 144 002 B 1, which contain about 1 mg/cm$^2$ of raney nickel bound with PTFE (polytetrafluoroethylene) to a Cu or Ni net rolled out. The metal net assures the distribution of the heat of decomposition, while the PTFE binding of the catalyst reduces grain decomposition. Two rounds each of 1-cm diameter, when laid one upon the other, form such a bed. For the absorption of the volume of the remaining solution, water-binding substances, such as kieselguhr, swelling agents, or plastic sponge can be introduced into the reactor space, to keep the fine-pored hydrophobic membrane from being blocked by a liquid film for gas penetration.

Alternatively to the above described arrangement, 0.1 g of NaBH$_4$ powder together with 0.2 g of dry raney nickel may be mixed and introduced into reactor space 6 of FIG. 1. The liquid in conveying space 4 consists of weakly alkaline buffered water. The decomposition reaction occurs upon the injection of the liquid from conveying space 4 into reactor space 6. For reactor space 6, one can also use a mixture that is produced by mixing borate powder with raney nickel and PTFE powder in a high-speed mixing apparatus.

In the case of a conveying apparatus driven by decomposition of H$_2$O$_2$ solution, according to the invention, for reasons of safety, an oxygen evolution cell is used, although the first step can also be driven with hydrogen. The decomposable liquid is 30% aqueous H$_2$O$_2$ solution. Using a silver catalyst, 100 Ncm$^3$ of gas are evolved per 1 g of the solution. When a 70% solution is used, 230 Ncm$^3$ of gas are evolved. Rounds of "highly active silver electrodes" described in column 3 of German patent DE-OS 37 10 168 A1 are recommended as the catalyst. Since this electrode consists of Ag$_2$O before its reduction, it can also be incorporated in this state, since the Ag$_2$O is reduced by H$_2$O$_2$ and the oxygen thus liberated increases the conveying quantity. Otherwise, the measures described for the decomposer of borate solution can be extrapolated for the invention in this embodiment. Only the gas cell current initiating the decomposition process is to be doubled compared to the hydrogen evolution cell in order to generate the same gas volume.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A process for conveying flowable media, comprising the steps of:
   (a) generating gas using one or more gas evolution cells;
   (b) conveying, by action of the generated gas, a first substance from a storage container into a reactor space containing a second substance;
   (c) generating additional gas in the reactor space from reaction of the first and second substances; and
   (d) driving a piston, by action of the generated additional gas, to convey the flowable media.

2. The process of claim 1, wherein the reactor space further contains a decomposable substance when the first and second substances are not spontaneously decomposable.

3. The process of claim 2, wherein the first substance is a liquid, the second substance is a decomposing catalyst, and the decomposable substance is dissolved by the liquid when the liquid is conveyed into the reactor space, thereby enabling the decomposable substance to react with the decomposing catalyst.

4. The process of claim 1, wherein the gas evolution cell generates hydrogen.

5. The process of claim 4, wherein one of the first and second substances comprises a solution, a paste, or a powder of a metal borate ($MBH_4$), where M stands for an alkali metal.

6. The process of claim 5, wherein the alkali metal is sodium, potassium, or lithium.

7. The process of claim 1, wherein the gas evolution cell generates oxygen.

8. The process of claim 7, wherein one of the first and second substances comprises a solution or a paste of hydrogen peroxide.

9. An apparatus for conveying flowable media, comprising:
   (a) means for generating gas using one or more gas evolution cells;
   (b) means for conveying, by action of the generated gas, a first substance from a storage container into a reactor space containing a second substance;
   (c) means for generating additional gas in the reactor space from reaction of the first and second substances; and
   (d) means for driving a piston, by action of the generated additional gas, to convey the flowable media.

10. An apparatus for conveying flowable media, comprising:
    (a) one or more gas evolution cells adapted to generate gas;
    (b) a first cylinder connected at a first end to the one or more gas evolution cells and comprising:
       (1) a first piston separating, within the first cylinder, a working space from a first conveying space adapted to contain a first substance;
       (2) a first valve separating, within the first cylinder, the first conveying space from a reactor space adapted to contain a second substance; and
       (3) a second valve at a second end of the first cylinder; and
    (c) a second cylinder connected to the second end of the first cylinder, comprising a second piston separating, within the second cylinder, a gas space from a second conveying space adapted to contain the flowable media, wherein, when the one or more gas evolution cells generate gas, the generated gas enters the working space, thereby driving the first piston into the first conveying space, thereby driving the first substance contained therein through the first valve and into the reactor space, wherein the first and second substances react to generate additional gas that enters the gas space through the second valve, thereby driving the second piston into the second conveying space, thereby conveying the flowable media.

11. The apparatus of claim 10, comprising two or more gas evolution cells connected in parallel for gas flow but electrically in series.

12. The apparatus of claim 10, wherein the first valve is a coarse-pored hydrophobic disk and the second valve is a fine-pored hydrophobic disk that blocks liquid but is porous to gas.

13. The apparatus of claim 12, wherein the first conveying space is adapted to contain the first substance in a form absorbed in an expressible spongy body.

14. The apparatus of claim 13, wherein the reactor space is adapted to contain a decomposable substance in powder form together with the second substance, when the first and second substances are not spontaneously decomposable.

15. The apparatus of claim 12, wherein the reactor space is adapted to contain a decomposable substance in powder form together with the second substance, when the first and second substances are not spontaneously decomposable.

16. The apparatus of claim 10, wherein the first conveying space is adapted to contain the first substance in a form absorbed in an expressible spongy body.

17. The apparatus of claim 16, wherein the reactor space is adapted to contain a decomposable substance in powder form together with the second substance, when the first and second substances are not spontaneously decomposable.

18. The apparatus of claim 10, wherein the reactor space is adapted to contain a decomposable substance in powder form together with the second substance, when the first and second substances are not spontaneously decomposable.

19. The apparatus of claim 10, wherein the first valve comprises polytetrafluoroethylene.

20. The apparatus of claim 19, wherein the first valve further comprises a water vapor-blocking bursting membrane.

21. The apparatus of claim 20, wherein:
    the first valve is a coarse-pored hydrophobic disk and the second valve is a fine-pored hydrophobic disk that blocks liquid but is porous to gas;
    the first conveying space is adapted to contain the first substance in a form absorbed in an expressible spongy body;
    the reactor space is adapted to contain a decomposable substance in powder form together with the second substance, when the first and second substances are not spontaneously decomposable.

* * * * *